Patented Aug. 18, 1931

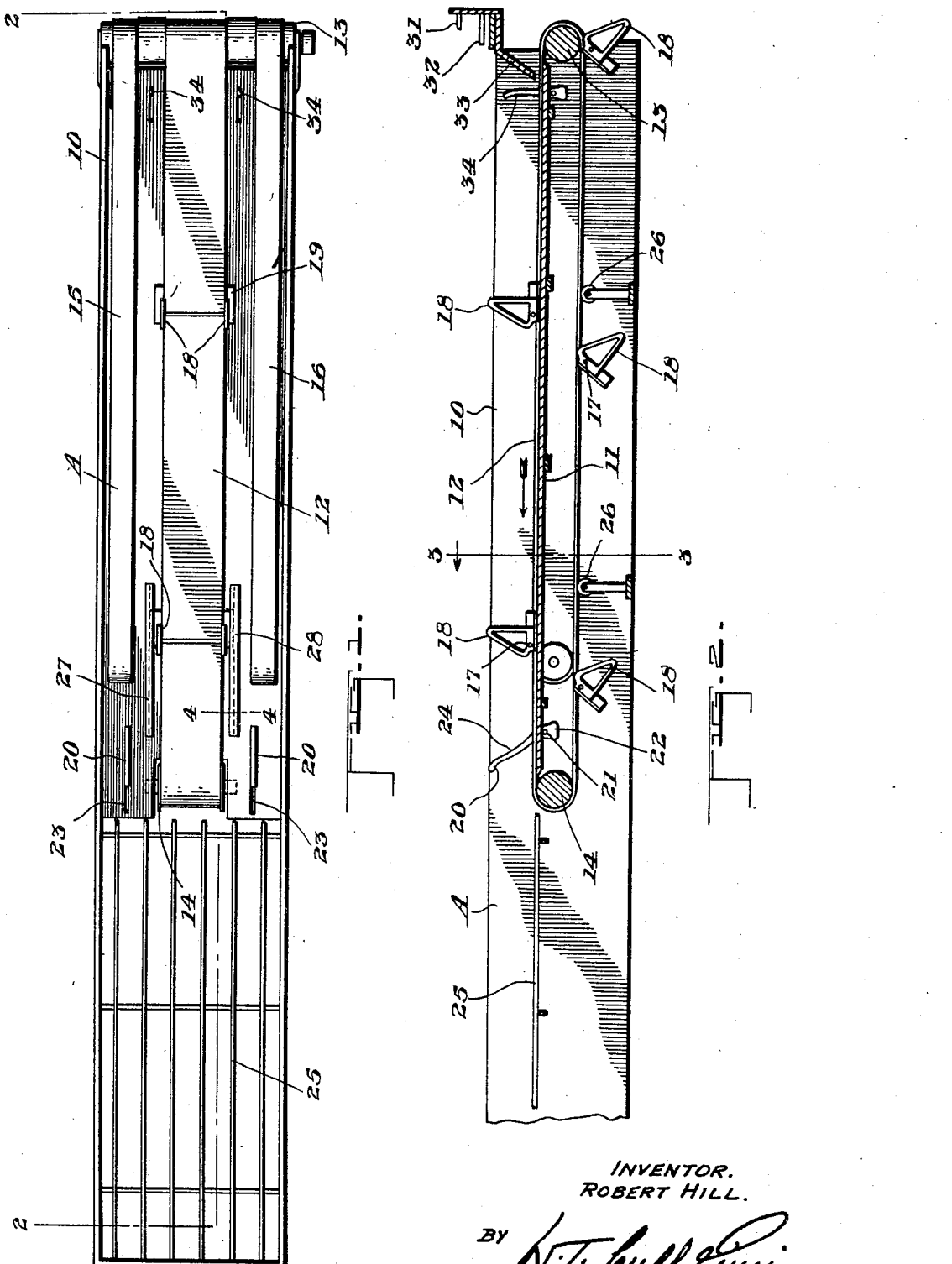

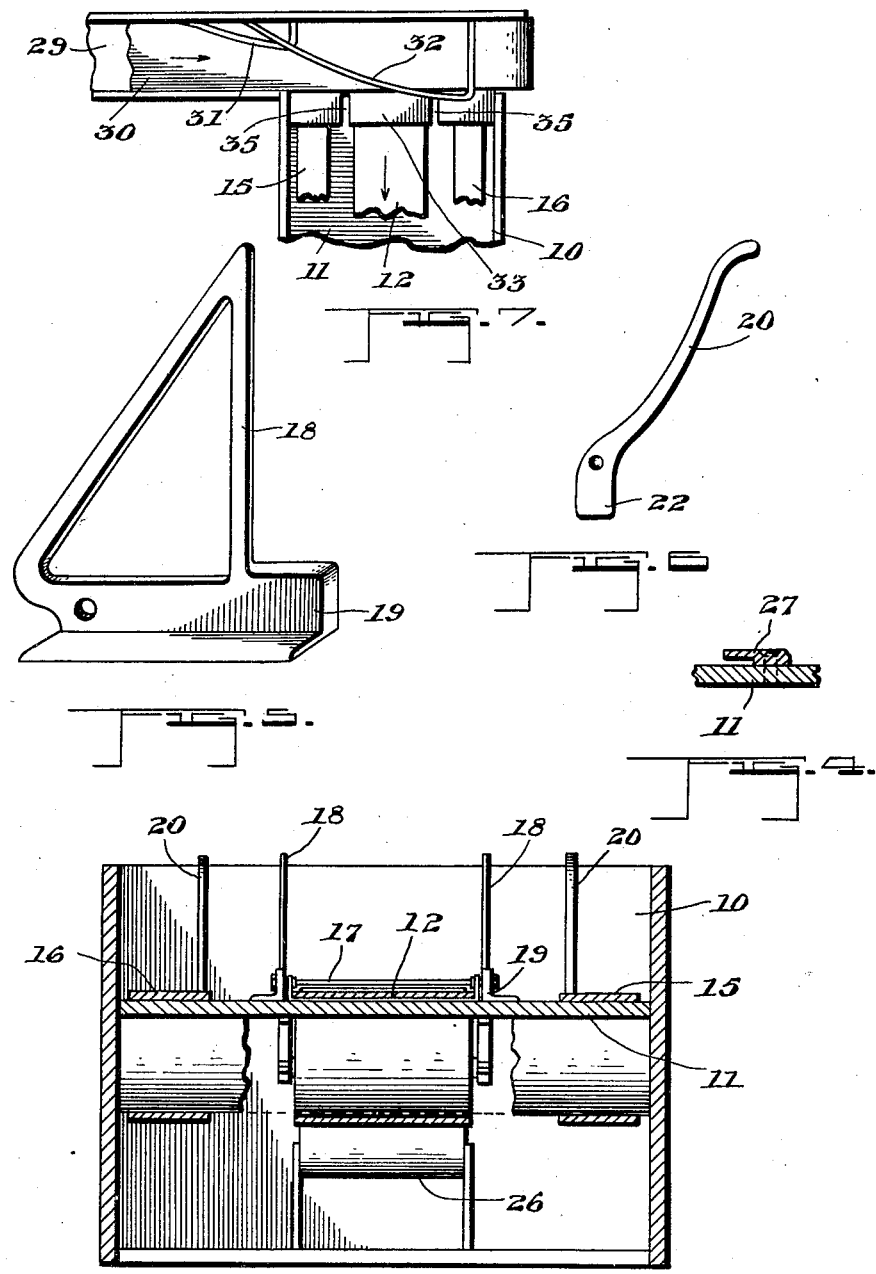

1,819,556

UNITED STATES PATENT OFFICE

ROBERT HILL, OF AYLMER, QUEBEC, CANADA

APPARATUS FOR STACKING MAIL

Application filed October 21, 1929, Serial No. 401,289, and in Canada September 26, 1929.

This invention relates generally to methods and apparatus for sorting and distributing mail and other matter of various kinds, and more particularly to apparatus for carrying out the method, which forms the subject matter of a separate co-pending application.

The object of the invention is to provide apparatus in the form of a conveyor and stacker which will function satisfactorily and economically, operate automatically and more efficiently perform the various functions required of it, particularly in the conveying and stacking of letter mail and the like for sorting and distribution for final destination points.

A further object is to provide a device of this character of simple and durable construction adapted to be used with mechanical distributors such as are fully described in another co-pending and separate application.

With the foregoing and other objects hereinafter more fully referred to, the novel features of my invention comprise a conveyor belt having pivotally mounted thereon at spaced intervals, automatically operable carriers and cooperating therewith automatically operable stackers, whereby mail delivered to the belt is automatically retained in position for engagement with the stackers to be automatically stacked and discharged from the belt.

Referring now to the drawings in which an example of my invention is disclosed, and in which like numerals of reference indicate corresponding parts in each figure.

Fig. 1 is a plan view of the stacker and conveyor as a whole.

Fig. 2 is a section taken on the line 2—2 of Fig. 1.

Fig. 3 is an enlarged section on line 3—3 of Fig. 2.

Fig. 4 is a section on line 4—4 of Fig. 1.

Fig. 5 is a perspective view of one of the carrying members.

Fig. 6 is an enlarged detail of the automatic stacking member detached.

Fig. 7 is an enlarged detail showing the conveyor means for delivering mail to the stacker.

Referring now more particularly to the drawings, A designates the devices as a whole comprising a trough or frame 10 of any suitable construction or material and suitably mounted in this trough is a platform 11, and co-operating therewith a main conveyor belt 12 mounted in the platform of the trough and flush with the surface thereof on rollers 13 and 14 spaced from one another and operatively mounted at each end of the platform, in any well known manner. Either of these rollers can be operated manually or by being connected up in any well known manner to a suitable source of power, while the belt 12 may be of sufficient dimensions to take the place of the two auxiliary conveyor belts 15 and 16 shown in Figs. 1, 2, and 7, and to leave a run way on each side. Pivotally mounted, on cross bars 17 and secured to the belt 12, at suitably spaced intervals, in pairs, are the carriers 18 preferably formed of metal of substantially triangular construction, one at each side of the belt, and formed with a flat weighted foot portion 19 in contact with the platform to retain the carriers in upright position, relative to the belt 12, and whereby, as illustrated in Fig. 2, on their reaching the end of the platform, these members automatically swing or tumble downwardly on the belt, and on reaching the other end of the platform ascending, again automatically assume an upright or carrying position.

Associated with the belt and co-operating with the carriers 18, are stackers 20 (see Fig. 6) one on each side of the belt and preferably mounted, as at 21, below the belt. They are also weighted at their lower end 22 to be automatically retained in normal upright position protruding through slots 23 in platform 11. These stackers are also intermediately curved, as at 24, so that letters set in flat or massed vertical formation will, under the influence of the carriers, readily and slidably engage with and be stacked thereby, and on an accumulation of letters exerting sufficient pressure in transit, the stackers trip through the slots and permit the accumulated letters in stacked condition and moving with the belt, to slide off the end of the belt onto the table 25, the carriers at the same time tumbling with the downwardly travel of the belt. For more efficient operation of the belt 12, I provide underneath idler rollers 26 mounted in any well known manner on strip or board. For further facilitating operations, I provide slips or guide ways 27 and 28 on the run ways for the weighted feet of the carrier member. These slips are situated in the trough in proximity to the stackers and as the carriers with the massed letters engage with them, they enable the carriers to more efficiently, at this point, deliver the load to the stacker.

In operation, power being applied to either of the rollers 13 and 14, the belt 12 will be operated, while letters or the like are delivered thereon from a source of supply 29, (see Fig. 7) such as a conveyor belt 30 with guide bars 31 and 32 and a slide 33 from which the letters discharge onto the belt 12, where they are automatically engaged by the pivotally mounted arms 34. Then, as the carriers 18 continue to move with the belt 12, they pass through the slots 35, in the slide 33, and engage with the accumulated letters and still travelling will force the member 34 downwardly to a horizontal position, when the letters pass on with the belt until they reach the stackers 24, where they will travel up these curved members in stacked formation, when through their own weight and the pressure of the oncoming carriers, the stackers 24 will automatically dip through the slots 27 in the platform and permit free passage of the stacked letters onto the table 25. This operation is continuous until all the letters on the belt 12 are stacked, while as the carriers reach the end of the platform, and almost simultaneously with the dipping of the stackers, these members will automatically swing or tumble, as shown in Fig. 2, and be suspended from the under side of the belt 12, until they reach the rollers 13 at the opposite end of the platform, where being counter-balanced, they will progressively and automatically return to normal upright position.

As many changes could be made in the above construction and many apparently widely different embodiments of my invention, within the scope of the claims constructed without departing from the spirit or scope thereof, it is intended that all matter contained in the accompanying specification and drawings shall be interpreted as illustrative and not in a limiting sense.

What I claim for my invention is:

1. An automatic stacker for mail comprising a trough, a conveyor belt therein, means for operating said belt, gravity operable carrier members pivotally mounted on said belt and movable therewith, gravity operable stackers co-operating with the belt and means in the trough associated with the stackers permitting free vertical movement thereof through the trough.

2. An automatic stacker of the character described comprising a suitably supported trough provided with slots in the bottom thereof, a conveyor belt in the trough, counter-weighted carriers swingingly mounted on said belt and stackers pivotally mounted in the trough co-operating with said slots and normally assuming an upright position and adapted, under predetermined pressure, to engage with the slots, and on the pressure being removed, to automatically return to normal upright engaging position.

3. The combination with a trough provided with a false bottom having slots therein and having a conveyor belt operatively mounted therein, of swingingly mounted counter-weighted carriers arranged in pairs on said belt, counter-weighted stackers in the trough and in pivotal relationship to said belt and adapted for operative engagement with said slots, whereby letters are automatically massed in transit by the carriers and automatically stacked by the stackers before being discharged from the belt.

4. In an automatic stacker for mail, a trough provided with slots, a conveyor belt operatively mounted within the trough between the slots, swingingly mounted carriers normally assuming a vertical position relative to the belt and swingingly mounted stackers in the trough associated with said slots and normally assuming a vertical position relative to the belt, and adapted, under the influence of pressure, to automatically dip through the slots and to automatically return to protruding substantially vertical position, on the pressure being removed.

5. The invention, according to claim 2, in which slips or guideways are provided adjacent the slots, for engagement with the carriers.

6. The invention, according to claim 3, in which idler rollers are provided, on the other side of the conveyor belt.

7. The combination with a trough with openings in the base and a conveyor belt of tumbler carriers on the belt adapted to automatically assume and retain an upright position above the belt, and an inverted position below the belt, respectively, at different points in the travel of the belt and stackers operatively mounted in the trough normally assuming an upright position and adapted under the influence of pressure to dip through the slots and on the pressure being removed to automatically return to upright position.

8. In an apparatus for stacking mail, the combination with a trough provided with a base having slots therein, a conveyor belt co-operating with said base substantially between the slots, gravity operable carriers normally assuming an upright position on the belt, stackers normally assuming an upright position in the trough and designed under the influence of pressure of material on the belt to collapse or dip through the slots to permit passage of the material thereover and to then return automatically through the slots to normal upright position.

In witness whereof I have hereunto set my hand.

ROBERT HILL.